(12) United States Patent
Cain et al.

(10) Patent No.: US 7,714,993 B2
(45) Date of Patent: May 11, 2010

(54) POSITION INDICATING AND GUIDANCE SYSTEM AND METHOD THEREOF

(75) Inventors: Gary Cain, Springfield, OH (US); Mark Nichols, Christchurch (NZ); Hiroyuki Takagi, Ashburn, VA (US)

(73) Assignee: Trimble Navigation Limited, Sunnyvale, CA (US)

( * ) Notice: Subject to any disclaimer, the term of this patent is extended or adjusted under 35 U.S.C. 154(b) by 260 days.

(21) Appl. No.: 11/344,626

(22) Filed: Feb. 1, 2006

(65) Prior Publication Data
US 2007/0177133 A1 Aug. 2, 2007

(51) Int. Cl.
*G01C 1/00* (2006.01)
(52) U.S. Cl. .................. 356/139.04; 356/141.4
(58) Field of Classification Search .............. 356/3.01, 356/3.07–3.08, 3.1, 139.04, 141.5, 622, 623
See application file for complete search history.

(56) References Cited

U.S. PATENT DOCUMENTS 5,227,985 A * 7/1993 DeMenthon ............... 702/153
5,742,394 A 4/1998 Hansen
5,884,239 A * 3/1999 Romanik, Jr. .............. 702/150

FOREIGN PATENT DOCUMENTS

| EP | 0 717 261 A2 | 6/1996 |
| EP | 1 524 498 A1 | 4/2005 |
| FR | 2 686 917 A1 | 8/1993 |
| GB | 2 204 689 A | 11/1988 |
| GB | 2 341 025 A | 3/2000 |
| GB | 2 341 026 A | 3/2000 |

\* cited by examiner

*Primary Examiner*—Isam Alsomiri
(74) *Attorney, Agent, or Firm*—Dinsmore & Shohl LLP

(57) ABSTRACT

The present invention provides operators the ability to follow a predetermined path and achieve desired digging depth by watching steering and elevation indicators of just one system. The indicators are activated by data derived from the interception of signals generated by a single laser transmitter and a receiver array mounted on the machine. The system according to the present invention uses the multiple, tilted fan beams provided by the laser transmitter to calculate elevation angle and azimuth of the tool carried by machine.

31 Claims, 4 Drawing Sheets

POSITION INDICATING AND GUIDANCE SYSTEM AND METHOD THEREOF

BACKGROUND OF THE INVENTION

The present invention relates generally to position indicating and guidance systems and in particular, to a control system and method providing positional and guidance information to a machine carrying a tool for movement along a predetermined path at a worksite using a single laser transmitter and a detector array.

Construction relies heavily on positioning data. Construction performance, in particular productivity and quality of work, is tied to the speed and accuracy of positioning methods being used. Standard surveying techniques are relatively slow, require highly skilled operators, and remain prone to human error.

In a prior art laser transmitter, a narrowly focused, horizontally rotating beam of laser energy is used to provide a reference plane. The rotating beam intercepts a vertically extending array of photodetectors in a laser receiver to mark the elevation of the receiver with respect to the laser beam. The array extends typically 4 to 8 inches. Accordingly, the available data is limited to elevation over a rather small vertical range, and thus due to plane tilting and alignment iteration, establishing grade with such a conventional laser system is time consuming.

In another prior art laser transmitter, planes of light are emitted, instead of just a line of light showing level. The planes of light provide enough angle information that an associated receiver can calculate plumb alignment, elevation, and slope to the transmitter. However, in both the former and latter systems, information regarding the relative distance and direction (azimuth) from the receiver to the transmitter is not established.

To establish distance and direction, machine operators typically follow pre-surveyed direction markings on the stakes, string lines, a laser beam from a pipe laser, or by triangulation using a second laser transmitter. Furthermore, in excavating operations, the conventional depth indicating system is a rotating laser plane with a single laser receiver to indicate if the vertically oriented boom and bucket are above, below or on the desired elevation, with or without grade. However, it is to be appreciated that the length of the photodetection area of the single laser receiver limits the vertical operating range of such depth indicating systems to approximately ±2 and ±4 inches respectively. These narrow limits often result in the operator "searching for the beam" to regain depth indication.

Typically, direction of a machine, such as for example an excavator, is provided by pre-surveyed markings on stakes, string lines, or an additional laser transmitter, such as a pipe laser. However, these methods have known drawbacks. Line destruction resulting from construction site activity may result in digging delays, and using an additional laser is expensive. Furthermore, grade using a laser is established by sloping the laser energy plane until the sloped plane is pointed in the desired direction. This setup operation may require several checks, with an additional hand-held detector, and rotational iterations to achieve the desired grade. Accordingly, establishing distance, direction, and grade using a conventional laser system, stakes, string lines, pipe lasers, or a second transmitter is time consuming and adds additional costs.

SUMMARY OF THE INVENTION

It is against the above background, that the present invention provides a position indicating and guidance system providing at least depth and line information of a tool carried by a machine, such as for example, a scoop of an excavator or backhoe, or a bucket of a loader using a single laser transmitter and a receiver having a photodetector array. In one embodiment, the receiver provides integral grade and line indicators. Grade is simply set by entering it in the receiver, thereby eliminating the time consuming tilting and plane alignment required with conventional systems. In another embodiment, six degrees of positional information (x, y, z, pitch, roll, and yaw) is also provided by receiver from sensing the reference fans from the laser transmitter.

The present invention also provides the benefit of giving machine operators the ability to follow a predetermined path and achieve desired digging depth by watching steering and elevation indicators also provided to the receiver. The indicators of the position indicating system are activated by data derived from interception of signals generated by a single laser transmitter by the photodetector array. It is to be appreciated that because a photodetector array is used, the present invention provides the added benefit of increasing the vertical receiving range to meters, as opposed to the typical ±2 to 4 inches of vertical receiving range of a conventional laser receiver. As such, the present invention substantially reduces or eliminates the time need to deploy stakes and string lines, sync with the laser transmitter (i.e., beam searching), and the cost associated with using a second laser transmitter.

In one embodiment, a method for guiding a machine carrying a tool for movement along a predetermined path at a worksite is disclosed. The method comprises placing a fan-type laser transmitter at the worksite remote from the machine. The laser transmitter has an arbitrary reference direction and generates two fan-shaped laser beams. The method also includes sensing the two fan-shaped beams with at least four photodetectors fixed arbitrarily at known positions in a detector array having a three-dimensional shape. The detector array is placed at a known position on the machine. The method further includes setting a reference azimuth angle from the arbitrary reference direction into a control unit provided on the machine, the reference azimuth angle points in a direction parallel to the predetermined path, and computing a measured azimuth angle using information provided to the control unit by the detector array sensing the two fan-shaped beams. Additionally, the method includes determining position of the machine relative to the predetermined path via the control unit comparing the measured azimuth angle to the reference azimuth angle, and generating signals which help guide the machine along the predetermined path.

In another embodiment, a method for guiding a machine carrying a tool for movement along a predetermined path at a worksite is disclosed. The method comprises placing a fan-type laser transmitter at the worksite remote from the machine and on a reference line offset a distance from the predetermined path, the laser transmitter having an arbitrary reference direction, and setting a reference azimuth angle from the arbitrary reference direction into a control unit provided on the machine. The reference azimuth angle points in a direction parallel to the predetermined path. The method also includes establishing a desired grade by entering into the control unit a percent slope, the control unit converting the percent slope to an equivalent reference elevation angle, and receiving a measured azimuth angle and a measured elevation angle from the fan-type laser transmitter with a detector array. The detector array has a plurality of photodetectors geometrically arranged and spaced apart at known locations, and is mounted to the machine at a known location. The method further includes comparing the measured azimuth angle to the reference azimuth angle, comparing the measured elevation angle to the reference elevation angle, and generating signals which indicate that the tool is left, right or on the predetermined path, and that the tool is above, below or on the desired grade. The comparing and generating is performed by the control unit.

In still another embodiment, a control system to guide a machine carrying a tool for movement along a predetermined path at a worksite is disclosed. The control system comprises a fan-type laser transmitter which when used in the control system is placed in the worksite remote from the machine on a reference line parallel to the predetermined path and set-up in an arbitrary reference direction, and at least four photodetectors fixed arbitrarily at known positions in a detector array having a three-dimensional shape. The detector array is placed at a known position on the machine and configured to receive a measured azimuth angle from the fan-type laser transmitter when in operation. The system also includes a control unit provided on the machine and configured to store a reference azimuth angle from the arbitrary reference direction. The reference azimuth angle when stored in the control unit points in a direction parallel to the predetermined path. The control unit is configured to generate signals which indicate at least a position of the tool relative to the predetermined path by comparing the measured azimuth angle to the reference azimuth angle when in use.

These and other features and advantages of the invention will be more fully understood from the following description of the various embodiments of the invention taken together with the accompanying drawing. It is noted that the scope of the claims is defined by the recitations therein, and not by the specific discussion of features and advantages set forth in the present description.

BRIEF DESCRIPTION OF THE DRAWINGS

The organization and manner of operation of the invention, together with further objects and advantages thereof, may best be understood by reference to the following description taken in connection with the accompanying drawing in which.

DETAILED DESCRIPTION

Figure 1:
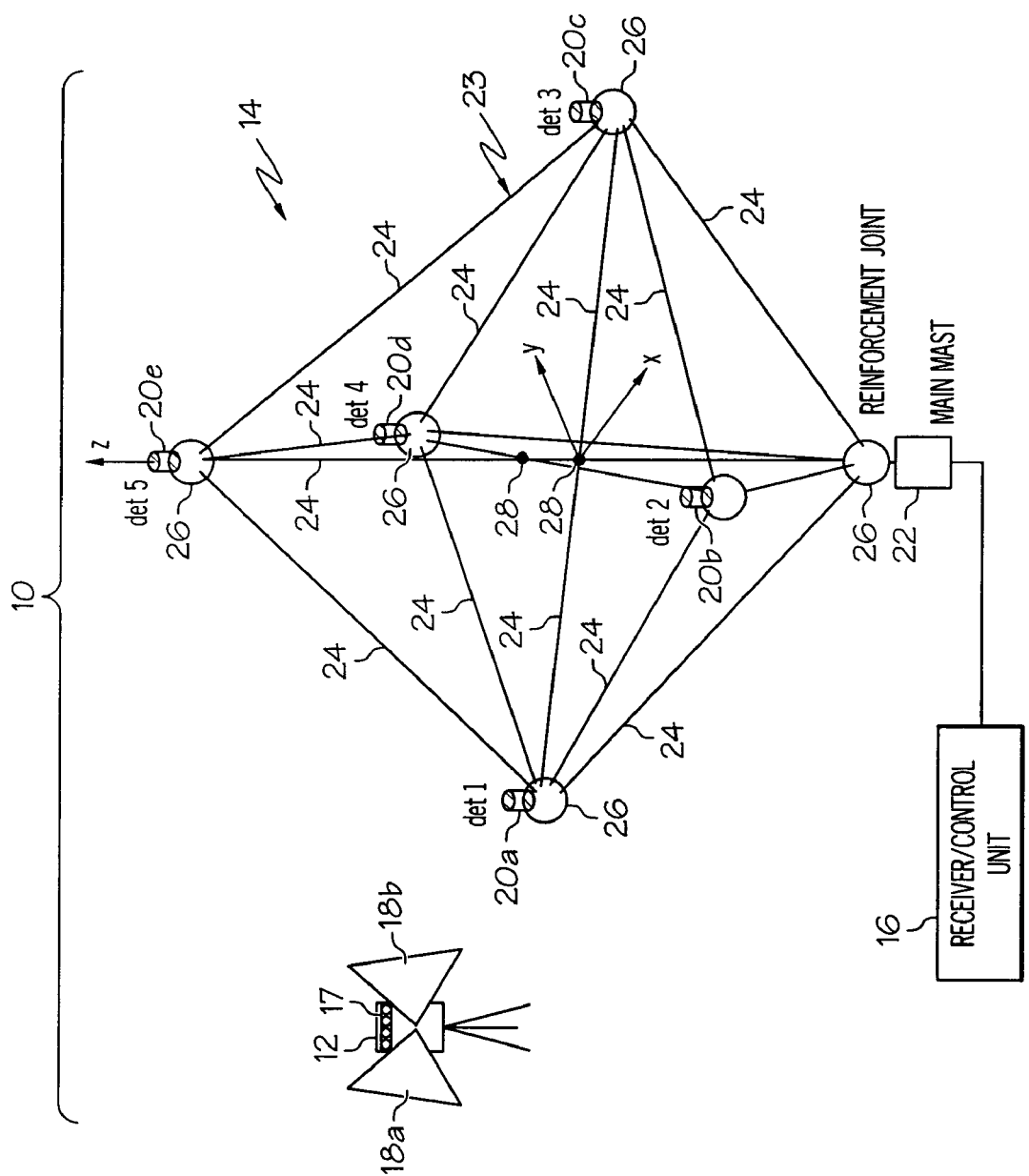
FIG. 1 is a schematic block diagram of one embodiment of a position indication system comprising a fan type laser transmitter and a receiver having a photodetector array according to the present invention.

While the invention may be susceptible to embodiment in different forms, there is shown in the drawings, and herein will be described in detail, specific embodiments with the understanding that the present disclosure is to be considered an exemplification of the principles of the invention, and is not intended to limit the invention to that as illustrated and described herein.

Skilled artisans appreciate that elements in the drawing are illustrated for simplicity and clarity and have not necessarily been drawn to scale. For example, the dimensions of some of the elements in the drawing may be exaggerated relative to other elements to help to improve understanding of the various embodiments of the present invention.

FIG. 1 shows generally one illustrative embodiment of a position indication system 10 according to the present invention. The present invention addresses all the problems mentioned in the background above by providing a single fan-type laser transmitter 12, a detector array 14, and a control unit 16. The laser transmitter 12 is a conventional laser transmitter, such as sold by Trimble, Inc., under model number LS920, and provides a LED strobe 17 as well as at least two light planes 18a and 18b, instead of just a line of light showing level. The generated LED strobe energy 17 and the light planes 18a and 18b provide enough angle information such that the control unit 16 can calculate azimuths and elevation angles to the laser transmitter 12 from detection information provided by each photodetector 20a, 20b, 20c, 20d, 20e of the detector array 14. In one embodiment, the laser transmitter 12 may be self-leveling, and easily positioned at the worksite via a tripod.

As shown, the photodetectors 20a-e are spaced geometrically apart. In the illustrated embodiment shown by FIG. 1, the detector array 14 also comprises a mechanical mounting 22 to secure an array support frame 23 to a machine. The array support frame 23 comprising, such as for example, but not limited to, pipes 24, pipe joiners 26, and two-pipe cross joints 28, for securing and maintaining the photo-detectors 20 in the desire geometrical shape are provided. The detector array 14 in the illustrated embodiment provides five photo-detectors 20a-e, labeled as Det1, Det2, Det3, Det4, and Det5, respectively. In one embodiment, nominal positions of the photodetectors 20a-e in x, y, and z coordinates are listed by Table 1.

TABLE 1

| Detector | x | y | z |
|---|---|---|---|
| Det1 | −0.5 m | −0.5 m | 0.0 m |
| Det2 | 0.5 m | −0.5 m | 0.1 m |
| Det3 | 0.5 m | 0.5 m | 0.0 m |
| Det4 | −0.5 m | 0.5 m | 0.1 m |
| Det5 | 0.0 m | 0.0 m | 1.0 m |

It is to be appreciated that the positions of the photodetectors 20a-e are within 0.2 mm one sigma tolerance in the x, y and z coordinates, or have a displacement of 0.3 mm one sigma tolerance from the nominal position by the design and construction method. Such tolerance is checked with a surveying instrument of the same accuracy of displacement of 0.3 mm one sigma tolerance or better. If desired, the surveyed positions may be used as nominal positions in the setup procedure of the position indication system 10.

In the illustrated embodiment, the shape of the array support frame 23 and nominal positions of the detectors 20a-e are such that the line of sight view of more than one detector at any detector array orientation within x-axis rotation of ±45° and y-axis rotation of ±45° and z-axis rotation of ±180° will always be unblocked. It is to be appreciated that the detector 20e designated Det 5 will remain unblocked in all orientations of the detector array 14. However, the differential displacement of detector on average per detector should not be more than 0.3 mm one sigma tolerance from the nominal position between 1 Hz and 80 Hz due to the vibration, resonance and flexure of the array when the array is subjected to the typical vibrations experienced on an excavating machine. In addition, the common displacement of detector should not be more than 10.0 mm one sigma tolerance from the nominal position between 0.1 Hz and 1 Hz due to the vibration, resonance and flexure of the array when the array is subjected to the typical vibrations experienced on an excavating machine. The photo-detectors 20a-e are also fixed to the array support frame 23 in a vertical orientation within ±3° accuracy.

Figure 2:
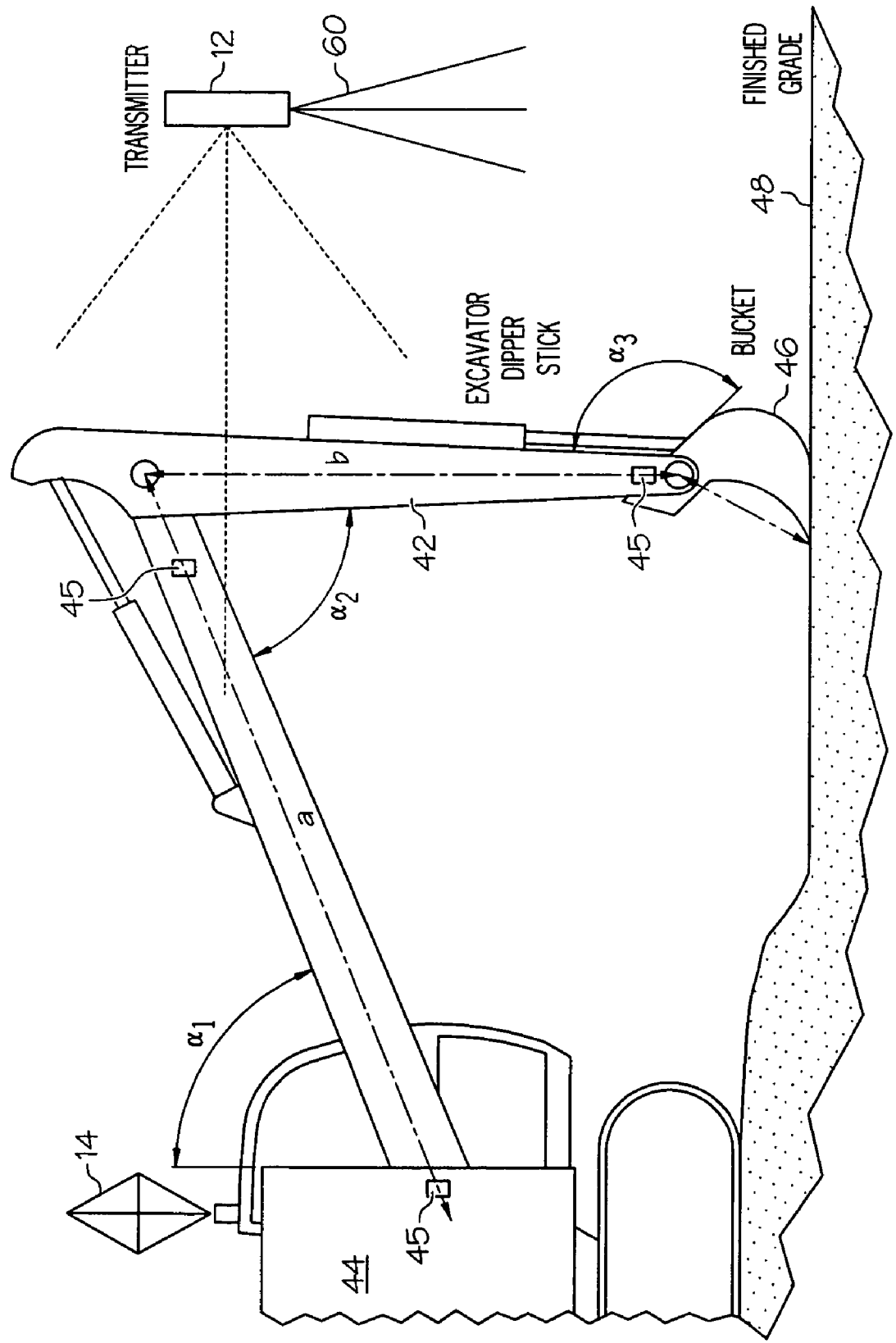
FIG. 2 is diagrammatic side view of a conventional excavator mounting a photodetector array thereon and being oriented to receive signals from a fan-type laser transmitter according to the present invention.

The array support frame 23 should be mounted on a machine so as to allow unobstructed view of the detector array 14 at any orientation of excavating machine within x-axis rotation of ±45° and y-axis rotation of ±45° and z-axis rotation of ±180°. In one particular embodiment, which is illustrated by FIG. 2, the detector array 14 is mounted to a machine carrying a working implement or tool such as, for example, a bucket or backhoe. In the illustrated embodiment, it is to be appreciated that the pyramid if mounted on the cab, care must be taken to ensure that the roof will not block the lower rear detectors when the excavator is tilted upward in the direction of transmitter. In one embodiment, the array should be mounted at least 0.7 m above the roof of the cab to prevent blocking of the lower detector 20a.

Figure 3:
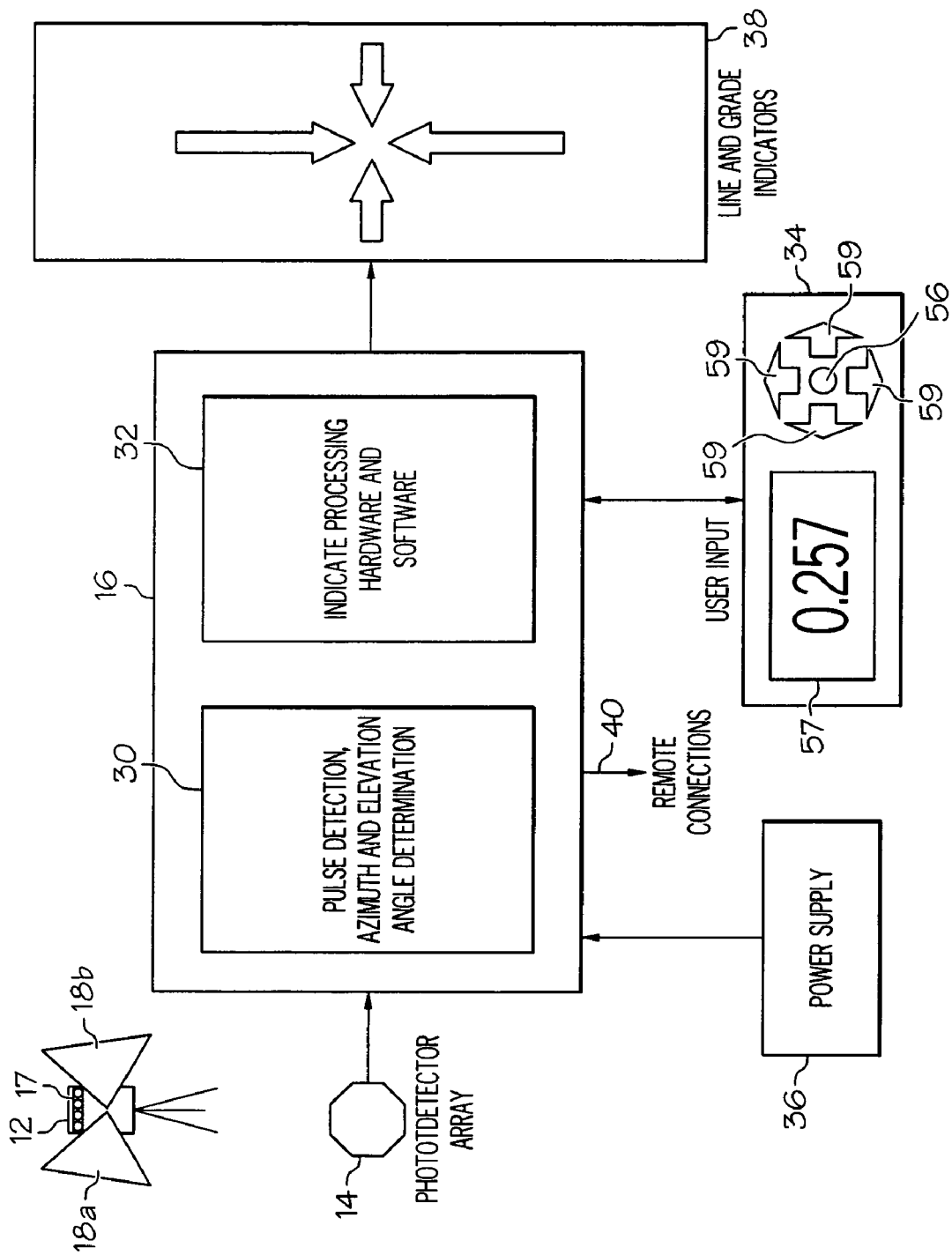
FIG. 3 is a schematic diagram of one embodiment of a control unit used in the position indication system of the present invention.

Referring now to FIG. 3, the control unit 16 is provided with integral detection and calculation electronics 30, as well as position indication processing, hardware and software, which are generally indicated by symbol 32. The control unit 16 provides pulse detection, azimuth and elevation angle processing, position determination, and display processing. A user-interface 34, providing display and control input functions, is either integral with the control unit 16 or remotely connected thereto. A power supply 36, either an integral battery or a machine power connection, powers the control unit 16 and all connected peripheral devices. Line and grade indicators 38 are also provided to the control unit 16 either on an integral display or on an optional remote display (not shown) via remote connections 40.

As mentioned previously, the information provided from the combination of the laser transmitter 12, detector array 14, and control unit 16 are position, orientation, azimuth (heading), and elevation angles with the origin of the coordinate system centrally located in the rotor of the laser transmitter. As illustrated in FIG. 2, the LED generated strobe energy 17 and each laser fan beam 18 emanating from the laser transmitter 12 diverges with distance. This divergence provides a wide vertical operating range of a boom or dipper 42 of a machine or excavator 44 carrying a tool or bucket 46 which is measured in meters, not just a few inches, thereby eliminating the requirement of having to search for the beam in order to setup the position indication system 10.

Figure 4:
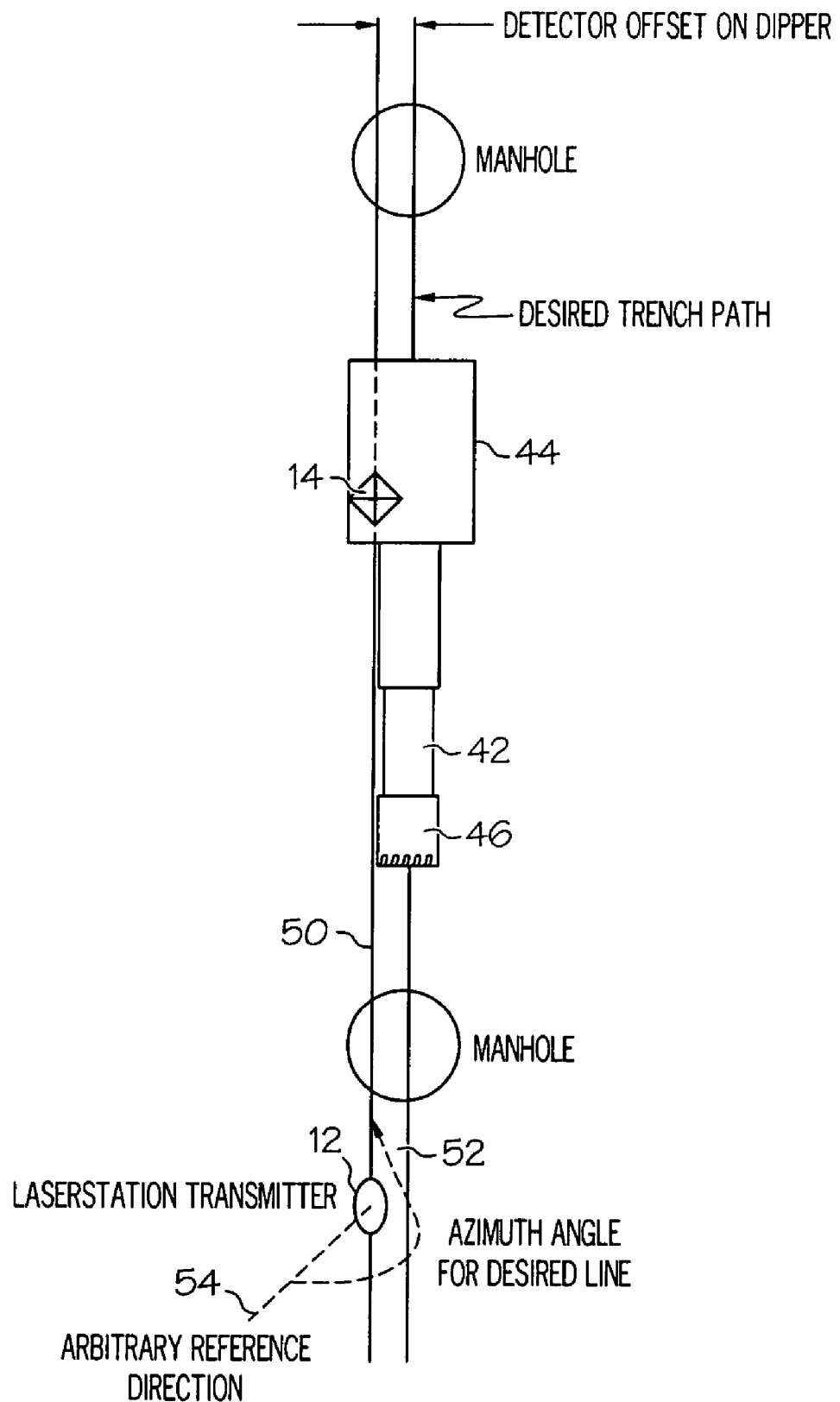
FIG. 4 is a block diagram showing an overhead view of an excavation operation using a system according to the present invention.

In the embodiment shown by FIG. 2, the system 10 is provided with a 0% grade setting, which represents a typical excavation operation working the ground 48. It is to be appreciated that other grades settings typical in the art may also be used with the system. The dipper 42 of the excavator 44 is vertically oriented with the bucket 46 in the measurement position at the proper depth. Next, with reference made also to FIG. 4 showing an overhead view of the excavation operation illustrated in FIG. 2, with the laser transmitter 12 arbitrarily (no rotational orientation required) positioned on a control line 50, an azimuth angle 52 from an arbitrary reference direction 54 is set that points in the direction of the desired heading. One approach for setting the azimuth angle 52 is to position the detector array 14 over a distant point that is on the desired control line 50, and press an 'Establish Line' button 56 on the control unit 16 (FIG. 3). The control unit 16 stores the measured azimuth as the reference azimuth angle for the desired heading, which is displayed on a display 57 provided to the user interface 34. The control unit 16 then compares the measured azimuth to the reference azimuth and error signals are sent to the indicators 38 to inform the operator that the machine is left, right or on line. The operator manually steers to correct the machine heading if it is not on line. Accordingly, the present invention eliminates the need for pre-surveyed stakes, string lines, and an additional laser.

To establish grade, the customer simply enters the percentage slope (grade) he wishes to follow using input buttons 59 provided also to the user interface 34. The control unit 16 converts the grade setting to the equivalent reference elevation angle. The equivalent reference elevation angle is calculated as follows:

$$\text{Elevation Angle} = \tan^{-1}(\% \text{ Slope}/100) \tag{1}$$

During operation, the measured elevation angle is compared to the reference elevation angle by the control unit 16. With the link lengths a, b, and c of the dipper stick 42 and buck 46 known, and their relative orientations $\alpha_1$, $\alpha_2$, and $\alpha_3$ to each other and the machine 44 known via encoders 45, providing angular and/or linear measurements therebetween, and being provided to the control unit 16 through the remote connections 40, the bucket vertical position is computed and displayed on the indictors 38 by the control unit 16 as above, on or below grade. Accordingly, the operator increases or decreases the digging depth as required to achieve an "on grade" indication.

After line and grade have been set in the control unit 16, the only remaining setup is to 'Bench' the system. This process calibrates the machine on grade elevation indication to be truly on grade. The dipper 42 is vertically positioned over a known elevation reference with the bucket 46 oriented for measurement. For example, an elevating tripod 60 may be used to support the transmitter 12, wherein the transmitter's elevation is changed to achieve a detector "on grade" indication. After the above set procedures, the system 10 is now ready to use.

Experimental Test Data

The practically of using a single laser transmitter to determine location of the tool carried for movement on the excavator in a work environment is illustrated in the following experimental test data. It is to be appreciated that the test setup is one illustrative embodiment implementing the present invention. In the illustrated embodiment of FIG. 3, the laser transmitter 12 puts out fans 18a and 18b of light, instead of just a line of light showing level. The fans of light provide enough angle information that a receiver can calculate azimuth and elevation angles to the transmitter. For the test and in the illustrated embodiment, the detector array 14, with the photo-detectors 20a-e (FIG. 1), was provided in the shape of a pyramid where all sides are of a known equal length. However, it is to be appreciated that the photodetectors in other embodiments may be fixed arbitrarily at known positions in a detector array having any three-dimensional shape. To reduce eclipsing one detector by another, two opposite detectors on the bottom were 0.1 m higher than the other two detectors. Using azimuth and elevation angles from the five photo-detectors, mathematical theory shows that position from the transmitter is determined to within 6" over 300 feet.

The RS232 port of each receiver was connected to a serial port to USB adaptor. The USB port of the adaptor was then connected to the laptop PC. This allows the angle data from the transmitter to the receiver detector to be concurrently collected and sent to the PC through the serial ports. Additionally, the transmitter used was a LS920 LaserStation3D self-leveling transmitter sold by Trimble, Sunnyville Calif. A program running in the control unit 16 was written to collect angle and position data from the pyramid detectors to display and store that data.

Test

During a test to determine feasibility and accuracy of the system, the pyramid array was mounted on a cart, and moved to a number of surveyed point locations. A transmitter, ATX2021A, was placed at a first origin plate of a known location. The transmitter characteristics are provided in Table 2.

TABLE 2

| ATX2O21A transmitter file: ASD | |
|---|---|
| PHI 1: | −0.5344294 |
| PHI 2: | 0.5360861 |
| ALPHA 1: | 1.5704627 |
| ALPHA 2: | 1.5664547 |
| THETA OFFSET: | 1.5657921 |
| SPEED: | 40.5000000 |
| X: | 0.0000000 |
| Y: | 0.0000000 |
| Z: | 0.0000000 |
| RX: | 0.0000000 |
| RY: | 0.0000000 |
| RZ: | −1.330782 |

During an initial setup at a second origin plate of a known position from the first origin plate, the measured position showed a difference of 0.2 m in x from the surveyed position. In order to absorb this error, the size of array was increased by 1.0044 m, wherein the transformed detector positions are provided in Table 3.

TABLE 3

| Transformed Detector Positions | |
|---|---|
| D1X: | −0.005089497 |
| D1Y: | 0.010946387 |
| D1Z: | −0.003872116 |
| D2X: | 0.706862597 |
| D2Y: | −0.726671158 |
| D2Z: | 0.099140237 |
| D3X: | 1.434281058 |
| D3Y: | 0.005010147 |
| D3Z: | −7.03108E−06 |
| D4X: | 0.700926356 |
| D4Y: | 0.709703153 |
| D4Z: | 0.098171957 |
| D5X: | 0.714250253 |
| D5Y: | 0.001011471 |
| D5Z: | 1.011894954 |

The control line angle was adjusted to give 0.0 m in y at the first point location. The cart was then moved to the various surveyed point locations and the detector 1 position was vertically aligned to the plate on the floor visually by eye. At each surveyed point location, the detected output was then compared to survey information. The results are shown below in Table 4, where the surveyed point locations are labeled pt91, pt41, pt24, pt115, and pt76 (in meters). As shown, the xy distance error ranges 2 to 5 cm (1-2"), and the z values were confirmed to be within a few millimeters.

TABLE 4

| in meter | x by pyra | y by pyra | z by pyra | plate x | plate y | plate z | dif x | dif y | xy dist |
|---|---|---|---|---|---|---|---|---|---|
| pt91 | 32.01 | 15.07 | −0.34 | 31.997 | 15.084 | −0.016 | 0.013 | −0.014 | 0.019164 |
| pt47 | 35.96 | 7.06 | −0.34 | 36 | 7.086 | −0.014 | −0.039 | −0.026 | 0.047344 |
| pt24 | 35.98 | 3.04 | −0.34 | 36.003 | 3.086 | −0.012 | −0.023 | −0.046 | 0.051117 |
| pt115 | 23.98 | 19.09 | −0.33 | 23.9968 | 19.083 | −0.006 | −0.017 | 0.007 | 0.018317 |
| pt76 | 7.983 | 11.071 | −0.35 | 7.999 | 11.083 | −0.018 | −0.016 | −0.012 | 0.01972 |

A second transmitter, ATX2021B, was then placed on the second origin plate location to compare the accuracy of the present invention to the conventional and more expensive two transmitter system. The transmitter characteristics are provided in Table 5.

TABLE 5

| ATX2O21B transmitter file: ASD | |
|---|---|
| PHI 1: | −0.5193683 |
| PHI 2: | 0.5160458 |
| ALPHA 1: | 1.5712155 |
| ALPHA 2: | 1.5715426 |
| THETA OFFSET: | 1.5744753 |
| SPEED: | 40.0000000 |
| X: | 36.0089858 |
| Y: | 0.0000000 |
| Z: | −0.0955599 |
| RX: | 0.0000000 |
| RY: | 0.0000000 |
| RZ: | −0.2971674 |

Simultaneous position measurements were then performed by the receiver of present invention (Pyramid) and a receiver of the two-transmitter system (LS920). About 200 samples were extracted from recorded data of each system collected at three different points. Blocked and spiky position data were eliminated. The spikes are caused by laser pulse collisions from the two different transmitters in the same window for the pulse tracker function. Since there will be no spikes in the one transmitter system, they were removed. The comparison on the three points is shown in Table 6.

TABLE 6

|  |  | x (m) | y (m) | z (m) |
|---|---|---|---|---|
| point 106 | Pyramid | 17.948 | 17.058 | −0.334 |
|  | LS920 | 17.956 | 17.07 | −0.337 |
|  | Diff | −0.008 | −0.012 | 0.003 |
| point 91 | Pyramid | 32.018 | 15.125 | −0.343 |
|  | LS920 | 32.004 | 15.093 | −0.347 |
|  | Diff | 0.014 | 0.032 | 0.004 |
| Point 47 | Pyramid | 36.01 | 7.086 | −0.342 |
|  | LS920 | 35.978 | 7.06 | −0.349 |
|  | Diff | 0.032 | 0.026 | 0.007 |

The vector length error was shown to be between the predicted typical and predicted max. The z-error seemed to exceed the max but it is suspected that the LS920 setup might have shifted overnight because it was not repeated the next day. The comparison of standard deviation is shown below in Table 7.

TABLE 7

| stddev | pyra x | pyra y | pyra z | LS x | LS y | LS z |
|---|---|---|---|---|---|---|
| point 106 | 0.013 | 0.013 | 0.000 | 0.003 | 0.001 | 0.000 |
| point 91 | 0.014 | 0.010 | 0.002 | 0.001 | 0.006 | 0.000 |
| point 47 | 0.032 | 0.006 | 0.001 | 0.000 | 0.001 | 0.000 |

It is noted that the x and y standard deviation of the pyramid measurement are closely proportional to the x and y coordinates, indicating the standard deviation is in radial direction. The comparison of standard deviation in Table 7 shows that the conventional two-transmitter system (LS920) was an order of magnitude better than the present invention (Pyramid), thereby justifying its use as a reference instrument.

Long Range Test

A long-range test was also conducted to check the worst-case error. The test was set up on a level ground with a long-range transmitter placed 100 m away from the pyramid array. The transmitter characteristics are provided in Table 8.

TABLE 8

Laser Transmitter Characterization at 100 METERS

Characterization Fixture: 1,
Phi 1 = −0.508985 radians,
Phi 2 = 0.534927 radians,
Theta Offset 1.569711 radians,
Alpha 1 = 1.570061 radians,
Alpha 2 = 1.567711 radians,
Calculated Speed 39.999952 Hz.

Measurements from 100 meter were attempted but the photo detectors would not pick up the signal from the transmitter at that distance. It is believed that the 100 m range is out of reach due to a threshold adjustment in the photodetectors being set too low but such range could easily be achieved if the threshold levels were factory set. The transmitter was then gradually moved closer toward the pyramid until the pyramid detected the laser. The range obtained was 74 m with the long-range transmitter.

Since the characterization of the above transmitter was not available at the time of testing, only the raw angle data was recorded. The angle data was later converted to position data after the correct transmitter parameters were provided. The pyramid position calculation simulator was run on the theta data of 192 measurements. The mean and standard deviation of xyz position, distance and angles were computed and shown in the following Table 9.

TABLE 9

| | At 74 m point | | | | | |
|---|---|---|---|---|---|---|
| | x (m) | y (m) | z (m) | distance (m) | azimuth (rad) | elevation (rad) |
| stddev | 0.01 | 0.103 | 0.001 | 0.103 | 0.000031 | 0.0000141 |
| mean | 7.528 | 73.697 | −0.932 | 74.087 | 1.469001 | −0.01257 |

The standard deviations of measurements in lateral direction are given by range times angle standard deviation. So, 74 m×30.9E-06=2 mm in azimuth and 74 m×14.1E-06=1 mm in elevation. These values are much smaller than the radial direction standard deviation of 0.103 m. This means the measurement noise is mostly in radial direction and the angles were very tight and accurate. The mean of the measured slant distance of the transmitter was 74.087 m, wherein the mean of the z height measured by transmitter was −0.932 m. These mean measurements matches very well with a conventional two transmitter system readings, 74.124 m slant distance and −0.974 in the z position, wherein in the differences between the two systems are 0.037 m in slant distance and 0.042 m in z height.

Next, the transmitter was moved to provide a separation of 62 meters to the array. The mean and standard deviation of xyz position, distance and angles detected by the system at 62 meters were computed and shown in the following Table 10.

TABLE 10

| | At 62 m point | | | | | |
|---|---|---|---|---|---|---|
| | x (m) | y (m) | z (m) | distance (m) | azimuth (rad) | elevation (rad) |
| Stddev | 0.005005 | 0.067273 | 0.001049 | 0.067446 | 0.000026 | 0.000010 |
| Mean | 4.578071 | 62.145910 | −0.981490 | 62.322040 | 1.497263 | −0.015750 |

The mean of the measured slant distance of the transmitter was 62.322 m, wherein the mean of the z height measured by transmitter was −0.981 m. The slant distance measured by the conventional two laser transmitter system is 62.377 m, and the z height −1.019 m, wherein in the differences between the two systems are 0.055 m in slant distance and 0.038 m in z height. This data is similar to the 74 m data except the distance standard deviation improved more than the range ratio. The ratio of the measured distance by the pyramid to that of the conventional two-laser transmitter system is 1.0005 at 74 m, and 1.0009 at 62 m.

During the position measurement test, the pyramid size was rescaled to compensate the error component proportional to the range. This is acceptable only if the array is always in the same orientation. If the array is viewed in different directions, the array should be measured in many perspective angles and should be averaged so that the scale factor difference is minimized from the mean scale factor. In one embodiment, the averaged array size for distance scaling is used, where position measurement testing such as described above has been completed in all direction of array while keeping photo-detector 20a at one fixed location. Ideally, the measured position remains the same regardless of the array orientation, which shows that the array was measured perfectly.

A simple error model of the detector array is given by a radial distance error formula:

$$e_{max,radial} = \frac{2}{L}(n_\theta R^2 + n_{array}R) \quad (2)$$

where $e_{max,\ radial}$ is maximum radial distance error, L is the nominal detector array size, $n_\theta$ is the theta noise level in rad, $n_{array}$ is the detector array differential position error and R is the range. All dimensional units are in meters. The first term is the error due to the theta noise and is quadratic in range, and the second term is the error due to the detector array measurement error and is proportional to the range. By averaging the pyramid position for a prolonged time, the first term error is made smaller, and the second term, although cannot be time-averaged, is reduced by array rotation averaging. For error prediction the following values were used:
  a. L=1 m
  b. $n_\theta$=10e-5 rad
  c. $n_{array}$=5.0e−4/sqrt(3) m Other Polyhedron:

To improve the accuracy of the array further and to reduce the theta noise to minimal as possible, there are two options: increase the array size or throw in more detectors. With one more detector, a hexahedron shaped array is provided. The next best shape is an octahedron or cube that requires 8 detectors. The 1 m cube will reduce the error to 18 cm max.

The above-described embodiments are intended to illustrate the principles of the invention, not to limit its scope. Other embodiments in variations to these preferred embodiments will be apparent to those skilled in the art and may be made without departing from the spirit and scope of the invention as defined in the following claims. For example, any type of wave energy, be it sonic, ultrasonic, laser or infrared, may be used to provide the above non-contact measurement of displacement, position, and heading.

What is claimed is:

1. A method for guiding a machine carrying a tool for movement along a predetermined path at a worksite, said method comprising:
  placing a fan-type laser transmitter at the worksite remote from the machine, said laser transmitter having an arbitrary reference direction and generating two fan-shaped laser beams;
  sensing the two fan-shaped beams with at least five individual interconnected photodetectors fixed arbitrarily at known positions in a detector support array having a three-dimensional shape generally configured as a pyramid such that at least one of the at least five individual interconnected photodetectors will always be unblocked in all orientations of the detector support array, said detector support array being placed at a known position on the machine said at least five photodetectors being geometrically arranged and spaced apart to reduce eclipsing of one detector by another;
  setting a reference azimuth angle from said arbitrary reference direction into a control unit provided on the machine, said reference azimuth angle points in a direction parallel to the predetermined path;
  computing a measured azimuth angle using information provided to the control unit by the detector array sensing the two fan-shaped beams;
  determining position of the machine relative to the predetermined path via said control unit comparing the measured azimuth angle to the reference azimuth angle; and generating signals which help guide the machine along the predetermined path.

2. The method according to claim 1 wherein said signals generated correspond to machine steering signals which compensation for deviations of movement of the machine from the predetermined path.

3. The method according to claim 1 further comprising sending said signals to a display to visually indicate that the machine is left, right, or on the predetermined path.

4. The method according to claim 1 further comprising:
  establishing a desired grade of the tool by entering into said control unit a percent slope, said control unit converting said percent slope to an equivalent reference elevation angle;
  receiving with said detector array a measured elevation angle from said fan-type laser transmitter;
  comparing said measured elevation angle to said reference elevation angle; and
  generating additional signals which indicate that the tool is above, below or on the desired grade, said comparing and generating being performed by said control unit.

5. The method according to claim 1 wherein said setting said reference azimuth angle is performed by positioning said detector array over a distant point that is on a control line defining said direction parallel to the desired trench path and pressing an 'Establish Line' button on said control unit.

6. The method according to claim 1 further comprises displaying said reference azimuth angle on a display.

7. The method according to claim 1 wherein said at least four photodetectors are geometrically arranged and spaced apart from each other in x, y and z coordinates.

8. The method according to claim 1 wherein said at least five photodetectors are geometrically arranged and spaced apart in the shape of a pyramid where all sides are of a known length.

9. The method according to claim 1 wherein said three-dimensional shape is a pyramid wherein two opposite detectors on a bottom of said pyramid are at a different elevation than the other two detectors on the bottom.

10. The method according to claim 1 wherein said three dimensional shape is such that a line of sight view of more than one detector to said laser transmitter at any detector array orientation within x-axis rotation of ±45°, y-axis rotation of ±45°, and z-axis rotation of ±180° will always be unblocked.

11. The method according to claim 1 wherein said at least five photodetectors are fixed to said detector array in a vertical orientation.

12. The method according to claim 1 wherein said control unit further provides pulse detection, azimuth and elevation angle processing, position determination, and display processing.

13. A method for guiding a machine carrying a tool for movement along a predetermined path at a worksite, said method comprising:
  placing a fan-type laser transmitter at the worksite remote from the machine and on a reference line offset a distance from the predetermined path, said laser transmitter having an arbitrary reference direction;
  setting a reference azimuth angle from said arbitrary reference direction into a control unit provided on the machine, said reference azimuth angle points in a direction parallel to the predetermined path;
  establishing a desired grade by entering into said control unit a percent slope, said control unit converting said percent slope to an equivalent reference elevation angle;
  receiving a measured azimuth angle and a measured elevation angle from said fan-type laser transmitter with a detector support array, said detector support array having a plurality of at least five individual interconnected photodetectors geometrically arranged in a three dimensional pyramid shape and spaced apart at known locations such that at least one of the at least five individual interconnected photodetectors will always be unblocked in all orientations of the detector support array, said five detectors being geometrically arranged and spaced apart to reduce eclipsing of one detector by another, said detector support array being mounted to the machine at a known location;

comparing said measured azimuth angle to said reference azimuth angle;

comparing said measured elevation angle to said reference elevation angle; and generating signals which indicate that the tool is left, right or on the predetermined path, and that the tool is above, below or on the desired grade, said comparing and generating being performed by said control unit.

14. The method according to claim 13 wherein said percent slope is entered into said control unit via a user interface.

15. The method according to claim 13 wherein said control unit converts said percent slope to said equivalent reference elevation angle by calculating $\tan^{-1}*(\% \text{ Slope}/100)$.

16. The method according to claim 13 wherein the machine carries the tool at the end of a plurality of movable links, and said method further comprises receiving, via said control unit, signals indicating relative orientations of said plurality of links to each other, said control unit using said signals and a comparison of said measured elevation angle to said reference elevation angle to determine if the tool is above, on or below the desired grade.

17. A control system to guide a machine carrying a tool for movement along a predetermined path at a worksite, said control system comprising:

a fan-type laser transmitter which when used in the control system is placed in the worksite remote from the machine on a reference line parallel to the predetermined path and set-up in an arbitrary reference direction;

at least five individual interconnected photodetectors fixed arbitrarily at known positions in a detector support array having a three-dimensional shape such that at least one of the at least five individual interconnected photodetectors will always be unblocked in all orientations of the detector support array, said detector support array being placed at a known position on the machine and configured to receive a measured azimuth angle from said fan-type laser transmitter when in operation said at least five photodetectors being geometrically arranged and spaced apart to reduce eclipsing of one detector by another; and a control unit provided on the machine and configured to store a reference azimuth angle from said arbitrary reference direction, said reference azimuth angle when stored in said control unit points in a direction parallel to the predetermined path, said control unit being configured to generate signals which indicate at least position of the tool relative to the predetermined path by comparing said measured azimuth angle to said reference azimuth angle when in use.

18. The control system according to claim 17 wherein said signals generated by said control unit correspond to deviations of movement of the machine from said predetermined path detected by said detector array.

19. The control system according to claim 17 further comprising a display that receives said signals to indicate that the tool is left, right, or on the predetermined path.

20. The control system according to claim 17 further comprising a user interface for entering into said control unit a percent slope, said control unit being configured to convert the percent slope to an equivalent reference elevation angle.

21. The control system according to claim 17 wherein said laser transmitter is configured to provide a measured elevation angle to said detector array, and said control unit is configured to compare said measured elevation angle to a reference elevation angle, and to generate additional signals which indicate that the tool is above, below or on the desired grade.

22. The control system according to claim 17 wherein said control unit includes an 'Establish Line' button for setting said reference azimuth angle into said control unit.

23. The control system according to claim 17 further comprises a display for displaying said reference azimuth angle.

24. The control system according to claim 17 wherein said three-dimensional shape is a pyramid.

25. The control system according to claim 17 wherein said at least five photodetectors are geometrically arranged and spaced apart from each other in x, y and z coordinates.

26. The control system according to claim 17 wherein said at least five photodetectors are arranged such that a line of sight view of more than one detector to said laser transmitter at any detector array orientation within x-axis rotation of ±45°, y-axis rotation of ±45° and z-axis rotation of ±180° will always be unblocked.

27. The control system according to claim 17 wherein said at least five photodetectors are arranged in a vertical orientation.

28. The control system according to claim 17 wherein said control unit is configured to provide pulse detection, azimuth and elevation angle processing, position determination, and display processing.

29. The control system according to claim 17 wherein said machine carries the tool at the end of a plurality of links, said control system further comprises encoders configured to provide signals indicating relative orientations of said link to each other, and said control unit being configured to use said signals and a comparison of a measured elevation angle to a reference elevation angle to determine if the tool is above, on or below a desired grade.

30. The control system according to claim 17 wherein said three-dimensional shape is a hexahedron.

31. The control system according to claim 17 wherein said three-dimensional shape is an octahedron.

* * * * *